United States Patent
Pak

(10) Patent No.: US 8,803,826 B2
(45) Date of Patent: Aug. 12, 2014

(54) FLAT PANEL DISPLAY WITH BUILT-IN TOUCH SENSORS

(75) Inventor: Sang-Jin Pak, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 256 days.

(21) Appl. No.: 13/282,324

(22) Filed: Oct. 26, 2011

(65) Prior Publication Data

US 2012/0105347 A1    May 3, 2012

(30) Foreign Application Priority Data

Oct. 29, 2010 (KR) .................. 10-2010-0106735

(51) Int. Cl.
*G06F 3/041* (2006.01)

(52) U.S. Cl.
USPC .......................................... 345/173; 349/12

(58) Field of Classification Search
USPC ............ 345/173–178; 349/12, 13; 178/18.01, 178/18.03, 18.05
See application file for complete search history.

(56) References Cited

U.S. PATENT DOCUMENTS

| | | | |
|---|---|---|---|
| 2004/0150629 A1 | 8/2004 | Lee | |
| 2009/0167718 A1* | 7/2009 | Lee et al. | 345/174 |
| 2009/0237369 A1* | 9/2009 | Hur et al. | 345/173 |
| 2010/0053115 A1* | 3/2010 | Kim et al. | 345/174 |
| 2010/0103121 A1* | 4/2010 | Kim et al. | 345/173 |
| 2011/0122348 A1* | 5/2011 | Sakai et al. | 349/110 |

FOREIGN PATENT DOCUMENTS

| | | |
|---|---|---|
| KR | 10-2005-0042917 A | 5/2005 |
| KR | 10-2006-0009602 A | 2/2006 |
| KR | 10-2008-0044683 A | 5/2008 |
| KR | 10-2009-0121635 A | 11/2009 |
| WO | WO 2010026682 A1 * | 3/2010 |

* cited by examiner

*Primary Examiner* — Amare Mengistu
*Assistant Examiner* — Stacy Khoo
(74) *Attorney, Agent, or Firm* — Christie, Parker & Hale, LLP

(57) ABSTRACT

A flat panel display with built-in touch sensors includes a first substrate having a plurality of gate lines extending in a first direction and a plurality of data lines extending in a second direction and crossing the gate lines, and a plurality of pixels respectively formed in regions defined by the gate and data lines. A second substrate is joined together with the first substrate with a liquid crystal layer interposed therebetween. A plurality of touch sensors are at positions adjacent to the respective pixels between the first and second substrates. Each of the touch sensors includes a conductive column spacer on the second substrate, a semiconductor layer in a region on the first substrate, corresponding to the conductive column spacer, and first and second electrodes respectively overlapped with the semiconductor layer in regions at both ends on the semiconductor layer.

12 Claims, 3 Drawing Sheets

FLAT PANEL DISPLAY WITH BUILT-IN TOUCH SENSORS

CROSS-REFERENCE TO RELATED APPLICATION

This application claims priority to and the benefit of Korean Patent Application No. 10-2010-0106735, filed on Oct. 29, 2010, in the Korean Intellectual Property Office, the entire content of which is incorporated herein by reference.

BACKGROUND

1. Field

Aspects of embodiments according to the present invention relate to a flat panel display, and more particularly, to a flat panel display having touch sensors built therein.

2. Description of the Related Art

A touch screen panel is an input device that allows a user's instruction to be inputted by selecting an instruction content displayed on a screen of an image display or the like with a user's hand or object.

To this end, the touch screen panel is formed on a front face of the image display to convert a contact position into an electrical signal. Here, the user's hand or object is directly in contact with the touch screen panel at the contact position. Accordingly, the instruction content selected at the contact position is inputted as an input signal to the image display.

Since such a touch screen panel can replace a separate input device coupled to an image display, such as a keyboard or a mouse, its application fields have been gradually expanded.

Touch screen panels are divided into a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing pattern and an adjacent sensing pattern, ground electrode or the like when a user's hand or object is in contact with the touch screen panel.

Such a touch screen panel may be attached to an outer surface of a flat panel display such as a liquid crystal display or an organic light emitting display so as to be implemented as a product.

However, in a case where a touch screen panel is attached to an outer face of a flat panel display, it is necessary to provide an adhesive layer between the touch screen panel and the flat panel display, and it is required to separately perform a forming process of the touch screen panel. Therefore, processing time and cost are increased.

Further, in the case of the conventional structure, the touch screen panel is attached to an outer surface of the flat panel display, and therefore, the entire thickness of the flat panel display is increased.

SUMMARY

Embodiments of the present invention are directed toward a flat panel display with built-in touch sensors, which can be implemented to be thin without an additional process of attaching a touch screen panel to the flat panel display by building touch sensors in the flat panel display.

According to an embodiment of the present invention, there is provided a flat panel display with built-in touch sensors. The flat panel display includes: a first substrate having a plurality of gate lines extending in a first direction and a plurality of data lines extending in a second direction and crossing the gate lines, and a plurality of pixels respectively formed in regions defined by the gate and data lines; a second substrate joined together with the first substrate with a liquid crystal layer interposed therebetween; and a plurality of touch sensors at positions adjacent to the respective pixels between the first and second substrates, wherein each of the touch sensors includes: a conductive column spacer on the second substrate; a semiconductor layer in a region on the first substrate, corresponding to the conductive column spacer; and first and second electrodes respectively overlapped with the semiconductor layer in regions at both ends on the semiconductor layer.

The touch sensors may be respectively formed at crossing regions of first and second sensing lines extending in parallel and spaced apart from the gate and data lines.

The conductive column spacer may include a protruding portion and a transparent conductive material on an outer surface of the protruding portion.

The second substrate may include a lattice-shaped black matrix in a region corresponding to a region that surrounds each of the pixels of the first substrate on a rear surface of an insulative transparent substrate, color filter patterns sequentially and repeatedly arranged corresponding to the respective pixels in an interior of the black matrix, and a common electrode including a transparent conductive material beneath the color filter patterns.

The flat panel display may further include a spacer for maintaining a cell gap between the first and second substrates, wherein the spacer may be between the first and second substrates.

The semiconductor layer may include amorphous silicon (a-Si) or polysilicon (poly-Si).

The flat panel display may further include an ohmic contact layer in a region in which the semiconductor layer is overlapped with each of the first and second electrodes.

The first electrode may be electrically coupled to the second sensing line and the second electrode may be electrically coupled to the first sensing line.

The flat panel display may further include a third electrode below the semiconductor layer. The third electrode may include an opaque metal and may overlap with the region of the touch sensor. The third electrode may be configured to be in a floating state.

The flat panel display may further include a conductive pad on top of the second electrode. The conductive pad may be electrically coupled to the second electrode.

As described above, according to embodiments of the present invention, touch sensors are built in a flat panel display, so that it is possible to implement a thin flat panel display capable of touch recognition without an additional process of attaching a touch screen panel to the flat panel display.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
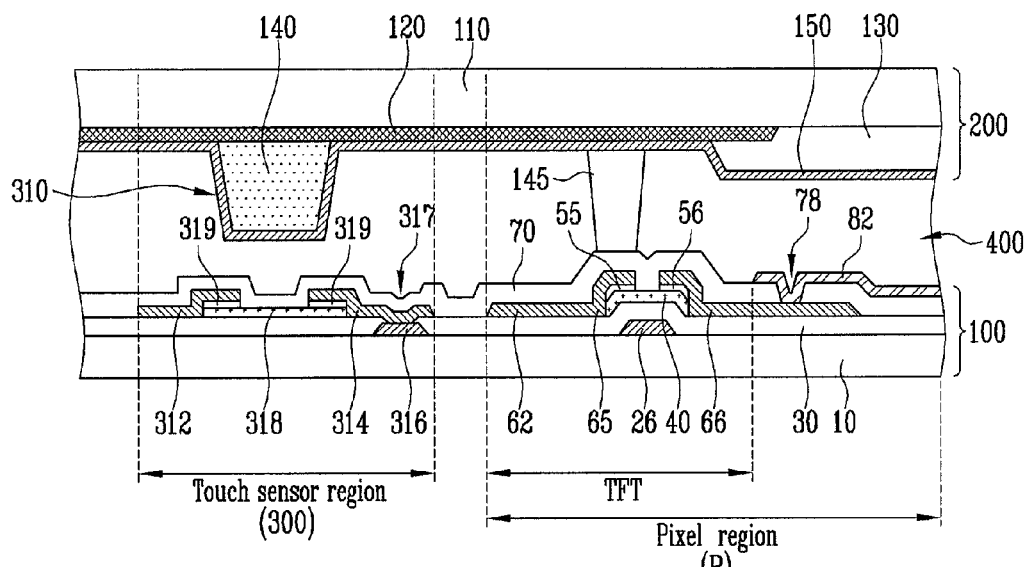
FIG. 1 is a sectional view showing one area of a flat panel display with built-in touch sensors according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly coupled to the another element or be indirectly coupled to the another element with one or more intervening elements interposed therebetween. Hereinafter, like reference numerals refer to like elements.

Hereinafter exemplary embodiments of the present invention will be described in detail with reference to the accompanying drawings.

Figure 2:
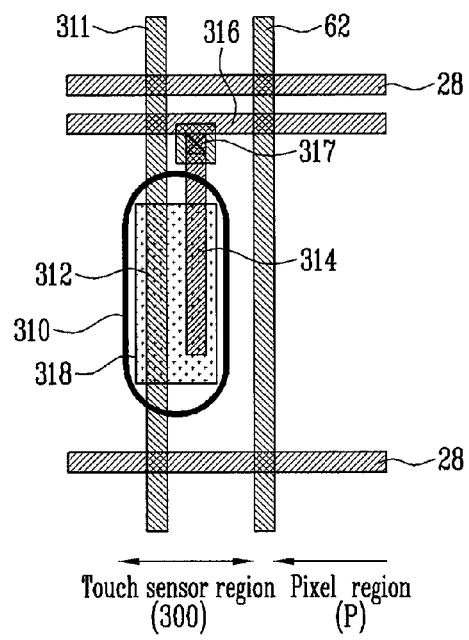
FIG. 2 is a plan view showing a touch sensor area shown in FIG. 1.

FIG. 1 is a sectional view showing one area of a flat panel display with built-in touch sensors according to an embodiment of the present invention. FIG. 2 is a plan view showing a touch sensor area shown in FIG. 1.

Although it is described in this embodiment that a liquid crystal display is implemented as the flat panel display, it is only one embodiment and the present invention is not necessarily limited thereto.

Referring to FIGS. 1 and 2, the flat panel display with built-in touch sensors according to an embodiment has a configuration in which a first substrate 100 as an array substrate and a second substrate 200 as a color filter substrate are joined together to face each other with a liquid crystal layer 400 interposed therebetween, and touch sensors 300 are formed between the first and second substrates 100 and 200.

Among these substrates, the lower first substrate 100 includes a plurality of gate lines 28 and a plurality of data lines 62, respectively extending in first and second directions to cross each other above an insulative transparent substrate 10. Thin film transistors TFT are provided at crossing regions of the gate and data lines 28 and 62 to be coupled to pixel electrodes 82 in a pixel area P one by one, respectively.

In this embodiment, the thin film transistor TFT includes a gate electrode 26 coupled to the gate line 28, a source electrode 65 coupled to the data line 62, a drain electrode 66 formed to be spaced apart from the source electrode 65 (e.g., at a predetermined interval), and a semiconductor layer 40 formed between the gate electrode 26 and the source/drain electrodes 65 and 66. Here, ohmic contact layers 55 and 56 are respectively formed in regions in which the semiconductor layer 40 is overlapped with the source/drain electrodes 65 and 66.

A gate insulating layer 30 is formed on the gate electrode 26, and a protection layer 70 is formed on the source/drain electrodes 65 and 66. A contact hole 78 for exposing the drain electrode 66 therethrough is formed in the protection layer 70.

The pixel electrode 82 is formed on top of the protection layer 40 to be coupled to the drain electrode 66 through the contact hole 78.

A lattice-shaped black matrix 120, color filter patterns 130 and a common electrode 150 are formed on the upper second substrate 200 opposite to the first substrate 100. The black matrix 120 surrounds the pixel areas P on the rear surface of an insulative transparent substrate 110 so as to cover a non-display area including the gate lines, the data lines, the thin film transistors and the like. The color filter patterns 130 are arranged sequentially and repeatedly to correspond to the respective pixel areas P in the interior of the black matrix 120. The common electrode 150 is formed of a transparent conductive material on the bottom of the color filter patterns 130.

In some embodiments, an overcoat layer may be further formed between the color filter patterns 130 and the common electrode 150.

A spacer 145 for maintaining a cell gap between the first and second substrates 100 and 200 is disposed between the substrates. In this embodiment, a column spacer is disposed between the substrates. However, the present invention is not limited thereto, and a ball spacer may be disposed between the substrates.

In the flat panel display according to an embodiment, the touch sensors 300 are provided between the first and second substrates 100 and 200. As shown in FIGS. 1 and 2, each of the touch sensors 300 is formed at one side of the pixel area P.

That is, as shown in FIGS. 1 and 2, the touch sensors 300 are formed at crossing regions of first and second sensing lines 316 and 311 that partition the pixel area P, respectively. The first sensing line 316 extends in parallel to the gate line 28 while being spaced apart from the gate line 28 (e.g., at a predetermined interval). The second sensing line 311 extends in parallel to the data line 62 while being spaced apart from the data line 62 (e.g., at a predetermined interval).

The touch sensor 300 includes a conductive column spacer 310 formed on the second substrate 200, a semiconductor layer 318 formed on a region of the first substrate 100, corresponding to the conductive column spacer 310, and first and second electrodes 312 and 314 respectively formed to be overlapped with the semiconductor layer 318 in regions (e.g., predetermined regions) at both ends on the semiconductor layer 318.

As shown in FIG. 1, the conductive column spacer 310 is implemented by forming the common electrode 150 made of a transparent conductive material on the outer surface of a protruding portion 140 formed on the black matrix 120.

Here, the protruding portion 140 may be made of the same material as the spacer 145. For example, the protruding portion 140 may be formed of a photosensitive resin. The height of the protruding portion 140 is formed to be smaller than that of the spacer 145.

The semiconductor layer 318 formed in a region of the touch sensor 300 on the first substrate 100 may be formed at the same layer through the same process as the semiconductor layer 40 of the thin film transistor TFT in the pixel area P.

The semiconductor layer 318 may be formed of a material such as amorphous silicon (a-Si) or polysilicon (poly-Si). In one embodiment, the semiconductor layer 318 is formed of the amorphous silicon (a-Si).

The first and second electrodes 312 and 314 overlapped with the semiconductor layer 318 in regions (e.g., predetermined regions) and spaced apart from each other are formed at both ends on the semiconductor layer 318, respectively. An ohmic contact layer 319 is formed in each of the regions in which the semiconductor layer 318 is overlapped with the first and second electrodes 312 and 314.

As shown in FIG. 2, the first electrode 312 is electrically coupled to the second sensing line 311, and the second electrode 314 is electrically coupled to the first sensing line 316.

That is, in this embodiment, the first electrode 312 may be integrally formed with the second sensing line 311, and the second electrode 314 may come in contact with the first sensing line 316 through a contact hole 317 formed in the gate insulating layer 30.

In an embodiment, one touch sensor 300 may be disposed per three unit pixels, i.e., a dot. However, this is not limited thereto, and the number, position and shape of the touch sensors 300 may be variously modified.

In the touch sensor 300, the conductive column spacer 310 provided on the second substrate 200 and the semiconductor layer 318 formed on the first substrate 100 are arranged opposite to each other while being spaced apart from each other (e.g., at a predetermined interval). The touch sensor 300 senses a change in dielectric constant according to a change in the gap between the conductive column spacer 310 and the semiconductor layer 318, thereby sensing a touch point or contact position.

That is, if a user touches a position (e.g., a predetermined position), the conductive column spacer 310 corresponding to the position receives a force applied downward, i.e., in the direction of the semiconductor layer 318, so that the interval between the conductive column spacer 310 and the semiconductor layer 318 is narrowed or reduced.

If the interval is narrowed or reduced as described above, a channel in the semiconductor layer 318 is activated by a voltage applied to the conductive column spacer 310, and current flows between the first and second electrodes 312 and 314 through the channel. As a result, the current flows between the first and second sensing lines 316 and 311 coupled to the touch sensor 300, thereby sensing the touch position.

Hereinafter, the operation of a touch sensor according to an embodiment will be described in detail with reference to FIG. 3.

Figure 3:
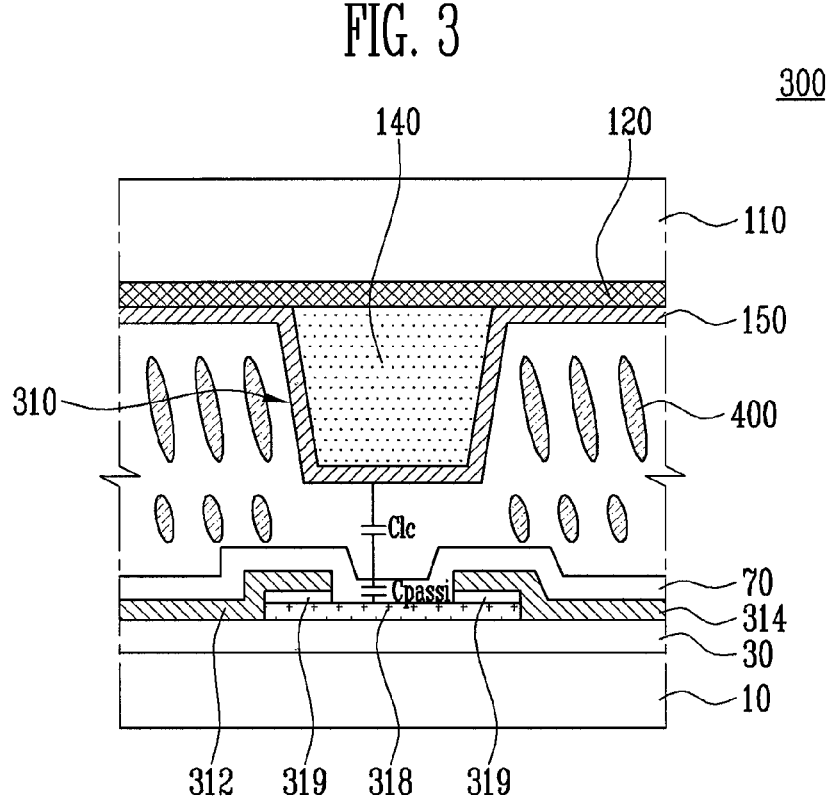
FIG. 3 is a sectional view showing the configuration of a touch sensor according to an embodiment of the present invention.

FIG. 3 is a sectional view showing the configuration of a touch sensor according to an embodiment of the present invention.

The sectional view of the touch sensor shown in FIG. 3 is substantially identical to that of the touch sensor shown in FIG. 1. Therefore, components identical to those of the touch sensor shown in FIG. 1 are designated by the same reference numerals, and their descriptions will be omitted.

Referring to FIG. 3, when comparing with the thin film transistor TFT provided in the pixel area P of FIG. 1, the touch sensor according to this embodiment is different from the thin film transistor TFT shown in FIG. 1 in that the gate electrode 26 that constitutes the thin film transistor TFT is removed and the function of the gate electrode 26 is performed by the conductive column spacer 310.

Thus, in the touch sensor 300, the gate insulating layer 30 of the thin film transistor TFT may be replaced with the protection layer 70 and the liquid crystal layer 400.

That is, the thin film transistor TFT is turned on by applying a voltage (e.g., a predetermined voltage) to the gate electrode 26. In this case, the channel of the semiconductor layer 40 is activated, and current flows from the source electrode 65 to the drain electrode 66.

In the TFT, the gate insulating layer 30 positioned between the gate electrode 26 and the semiconductor layer 40 is formed to have a fixed thickness, and therefore, the capacitance and dielectric constant of the gate insulating layer 30 are constant.

On the other hand, in the touch sensor 300, a constant voltage (e.g., common voltage) is always or periodically applied to the conductive column spacer 310, but the thickness of the protection layer 70 and the liquid crystal layer 400, which serve as the gate insulating layer 30, is changed depending on a degree of touch (e.g., pressure).

That is, in a case where the touch is not performed, the gap between the conductive column spacer 310 and the semiconductor layer 318 is wide. Thus, although voltage is applied to the conductive column spacer 310, the channel of the semiconductor layer 318 is not activated.

In other words, in a case where the touch is not performed, the gap between the conductive column spacer 310 and the semiconductor layer 318 is wide. Hence, the sum of the capacitance $C_{PASSI}$ by the protection layer 70 and the capacitance $C_{LC}$ by the liquid crystal layer 400, which are positioned between the conductive column spacer 310 and the semiconductor layer 318, and the dielectric constant are sufficiently large. Thus, the channel of the semiconductor layer 318 is not activated.

However, if a user touches a position (e.g., a predetermined position), the conductive column spacer 310 corresponding to the position receives a force applied downward, i.e., in the direction of the semiconductor layer 318, so that the gap between the conductive column spacer 310 and the semiconductor layer 318 is narrowed or reduced.

If the gap is narrowed or reduced as described above, the sum of the capacitance $C_{PASSI}$ by the protection layer 70 and the capacitance $C_{LC}$ by the liquid crystal layer 400, which are positioned between the conductive column spacer 310 and the semiconductor layer 318, and the dielectric constant are also decreased. Thus, the channel of the semiconductor layer 318 is activated by the voltage applied to the conductive column spacer 310.

Accordingly, current flows between the first and second electrodes 312 and 314 through the activated channel, and consequently, current flows between the first and second sensing lines 316 and 311 coupled to the touch sensor 300, thereby sensing the touch position.

Figure 4:
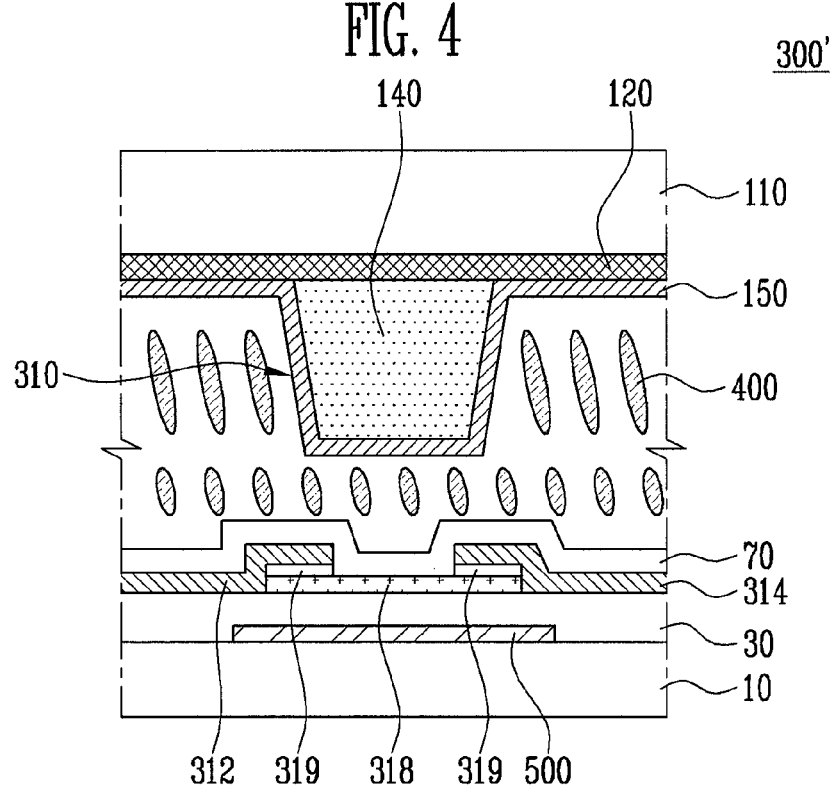
FIG. 4 is a sectional view showing the configuration of a touch sensor according to another embodiment of the present invention.

FIG. 4 is a sectional view showing the configuration of a touch sensor 300' according to another embodiment of the present invention.

In the embodiment shown in FIG. 4, components identical to those in the embodiment shown in FIG. 3 are designated by the same reference numerals, and their descriptions will be omitted.

Referring to FIG. 4, when comparing with the touch sensor 300 shown in FIG. 3, the touch sensor 300' according to this embodiment is different from the touch sensor 300 shown in FIG. 3 in that a floated third electrode 500 is further formed below the semiconductor layer 318.

Since the touch sensor 300' is positioned on a non-display area of a liquid crystal display panel, light emitted from a backlight unit in a lower region of the liquid crystal display panel may be prevented from being applied to the touch sensor.

Accordingly, in the embodiment shown in FIG. 4, the third electrode 500 made of an opaque metal is formed below the semiconductor layer 318 to be overlapped with a region of the touch sensor 300', so that it is possible to block light emitted from the backlight unit.

However, since the third electrode 500 is implemented in a floating state that a signal (e.g., a predetermined signal) is not applied thereto, the operation of the touch sensor 300' is substantially identical to that of the touch sensor 300 shown in FIG. 3.

Figure 5:
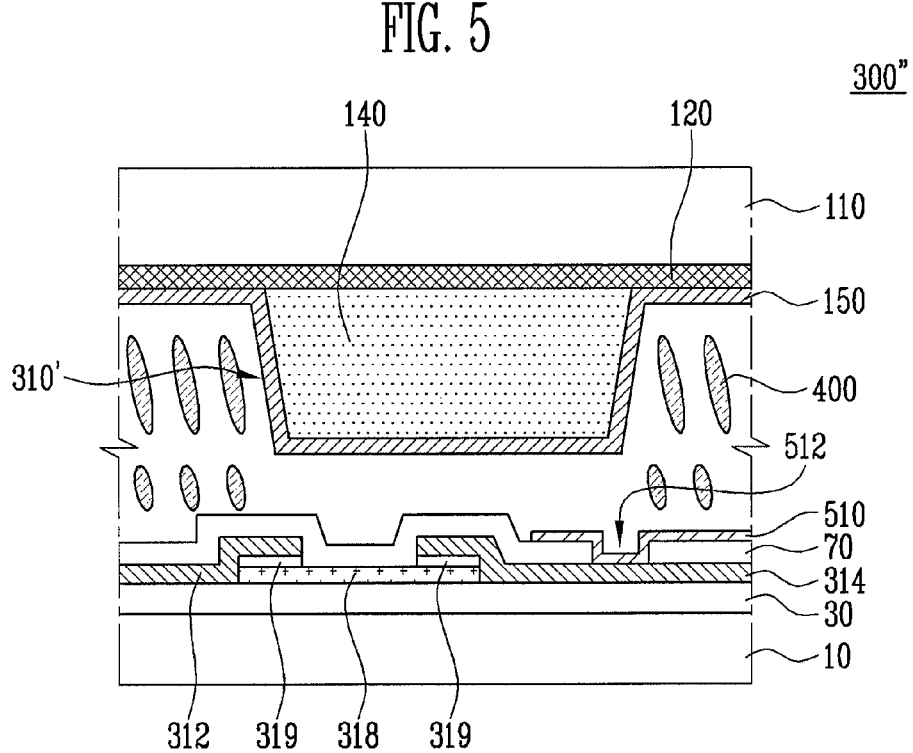
FIG. 5 is a sectional view showing the configuration of a touch sensor according to still another embodiment of the present invention.

FIG. 5 is a sectional view showing the configuration of a touch sensor 300" according to still another embodiment of the present invention.

In the embodiment shown in FIG. 5, components identical to those in the embodiment shown in FIG. 3 are designated by the same reference numerals, and their descriptions will be omitted.

Referring to FIG. 5, when comparing with the touch sensor 300 shown in FIG. 3, the touch sensor 300" according to this embodiment is different from the touch sensor 300 shown in FIG. 3 in that a conductive pad 510 is further formed on top of the second electrode 314.

That is, as shown in FIG. 5, a contact hole 512 is formed in a region of the protection layer 70 on the second electrode 314, and the conductive pad 510 is formed on the contact hole 512 to be electrically coupled to the second electrode 314.

In this case, a conductive column spacer 310' formed on the second substrate 200 is implemented to have a wider area than the conductive column spacer 300 so that when a touch is generated by a user, the conductive column spacer 310' can come into contact with the conductive pad 510.

The touch sensor 300" according to this embodiment implements touch recognition in substantially the same manner as the touch sensors 300 and 300' shown in FIGS. 3 and 4. The touch sensor 300" according to this embodiment senses a change in resistance according to a change in the gap between the conductive column spacer 310' and the conductive pad 510, generated when a user touches a position (e.g., a predetermined position), thereby implementing touch recognition.

Here, the implementation of touch recognition through the change in resistance will be described in more detail. When short and open circuits between the conductive column spacer 310' and the conductive pad 510 occur, a change in resistance is generated at the position of the touch sensor 300", and a corresponding voltage change is sensed accordingly, thereby sensing the touch position.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flat panel display with built-in touch sensors comprising:
    a first substrate having a plurality of gate lines extending in a first direction and a plurality of data lines extending in a second direction and crossing the gate lines, and a plurality of pixels respectively formed in regions defined by the gate and data lines;
    a second substrate joined together with the first substrate with a liquid crystal layer interposed therebetween; and
    a plurality of touch sensors at positions adjacent to the respective pixels between the first and second substrates, wherein each of the touch sensors comprises:
        a conductive column spacer on the second substrate;
        a semiconductor layer in a region on the first substrate, corresponding to the conductive column spacer;
        first and second electrodes respectively overlapped with the semiconductor layer in regions at both ends on the semiconductor layer; and
        a conductive pad on top of the second electrode and configured to contact the column spacer when a downward force is applied to the column spacer.

2. The flat panel display according to claim 1, wherein the touch sensors are respectively formed at crossing regions of first and second sensing lines extending in parallel to and spaced apart from the gate and data lines, respectively.

3. The flat panel display according to claim 1, wherein the conductive column spacer comprises a protruding portion and a transparent conductive material on an outer surface of the protruding portion.

4. The flat panel display according to claim 1, wherein the second substrate comprises:
    a lattice-shaped black matrix in a region corresponding to a region that surrounds each of the pixels of the first substrate on a rear surface of an insulative transparent substrate;
    color filter patterns sequentially and repeatedly arranged corresponding to the respective pixels in an interior of the black matrix; and
    a common electrode comprising a transparent conductive material beneath the color filter patterns.

5. The flat panel display according to claim 1, further comprising a spacer for maintaining a cell gap between the first and second substrates, wherein the spacer is between the first and second substrates.

6. The flat panel display according to claim 1, wherein the semiconductor layer comprises amorphous silicon (a-Si) or polysilicon (poly-Si).

7. The flat panel display according to claim 1, further comprising an ohmic contact layer in a region in which the semiconductor layer is overlapped with each of the first and second electrodes.

8. The flat panel display according to claim 2, wherein the first electrode is electrically coupled to the second sensing line and the second electrode is electrically coupled to the first sensing line.

9. The flat panel display according to claim 1, further comprising a third electrode below the semiconductor layer.

10. The flat panel display according to claim 9, wherein the third electrode comprises an opaque metal and overlaps with the region of the touch sensor.

11. The flat panel display according to claim 9, wherein the third electrode is configured to be in a floating state.

12. The flat panel display according to claim 1, wherein the conductive pad is electrically coupled to the second electrode.

* * * * *